United States Patent [19]

Yokota et al.

[11] Patent Number: 5,682,338

[45] Date of Patent: Oct. 28, 1997

[54] METHOD OF ESTIMATING INITIAL VALUES OF POTENTIAL IN SEMICONDUCTOR DEVICE SIMULATION

[75] Inventors: Ikuhiro Yokota; Shigetaka Kumashiro, both of Tokyo, Japan

[73] Assignee: NEC Corporation, Tokyo, Japan

[21] Appl. No.: 526,252

[22] Filed: Sep. 11, 1995

[30] Foreign Application Priority Data

Sep. 9, 1994 [JP] Japan .................................. 6-215541

[51] Int. Cl.$^6$ ............................................. G06F 9/455
[52] U.S. Cl. ................................. 364/578; 364/488
[58] Field of Search ............................ 364/578, 488, 364/489, 490, 491; 395/500

[56] References Cited

U.S. PATENT DOCUMENTS

| | | | |
|---|---|---|---|
| 5,103,415 | 4/1992 | Omura et al. | 364/578 |
| 5,289,384 | 2/1994 | Akiyama | 364/488 |

FOREIGN PATENT DOCUMENTS 0 421 684  10/1991  European Pat. Off.  ........ G06F 15/60

OTHER PUBLICATIONS

Kavadias et al., "Calculation of Pixel Detector Capacitance through three Dimensional numerical solution of the laplace equation", IEEE Transactions on Nuclear Science, vol. 41, No. 2, Apr. 1994, pp. 397–401.

Back et al, "A New Nonlinear Relaxation Scheme for solving Semiconductor Device Equation", IEEE transaction on Computer–Aided design, vol. 10 No. 9, Sep. 1991, pp. 1175–1186.

Kurata et al "An Explicit method of numerical integration for the complete set of semiconductor device Equations", IEEE Transactions on Computer–Aided Design. vol. 11, No. 8, Aug. 1992 pp. 1013–1023.

Edwards et al., "Initial Guess Strategy and Linear Algebra Techniques for a Coupled Two–Dimensional Semiconductor Equation Solver", GEC Research Limited, GEC Hirst Research Center (1990), pp. 272–280.

Kohyama, "Very High Speed MOS Devices", Clarendon Press, Oxford, (1985) pp. 277–291.

"Nasecode IV: Proceedings of the Fourth International Conference on the Numerical Analysis of Semiconductor Devices and Integrated Circuits", Jun. 19–21 1985, Trinity College, Dublin Ireland.

"A Fast, General Three–Dimensional Device Simulator and Its Application in a Submicron EPROM Design Study", Thomas D. Linton, Jr. et al. IEEE Transactions on Computer–Aided Design, vol. 8 No. 5, May 1989 pp. 508–515.

*Primary Examiner*—Kevin J. Teska
*Assistant Examiner*—Herbert McNair
*Attorney, Agent, or Firm*—Foley & Lardner

[57] ABSTRACT

In order to estimate an initial potential value for semiconductor device simulation at each of iterative procedures a computer system, a plurality of bias conditions are stored in a memory. Following this, one bias condition is retrieved from the memory at a given iterative procedure. Further, an analysis result already obtained in an iterative procedure, which precedes the given iterative procedure, is retrieved from the memory. Subsequently, an initial potential value is estimated which is used in the give iterative procedure by solving a Laplace equation which is weighted by a coefficient including a reciprocal of electric field intensity.

13 Claims, 9 Drawing Sheets

MESHES GENERATED FOR ANALYSIS

MESHES GENERATED FOR ANALYSIS

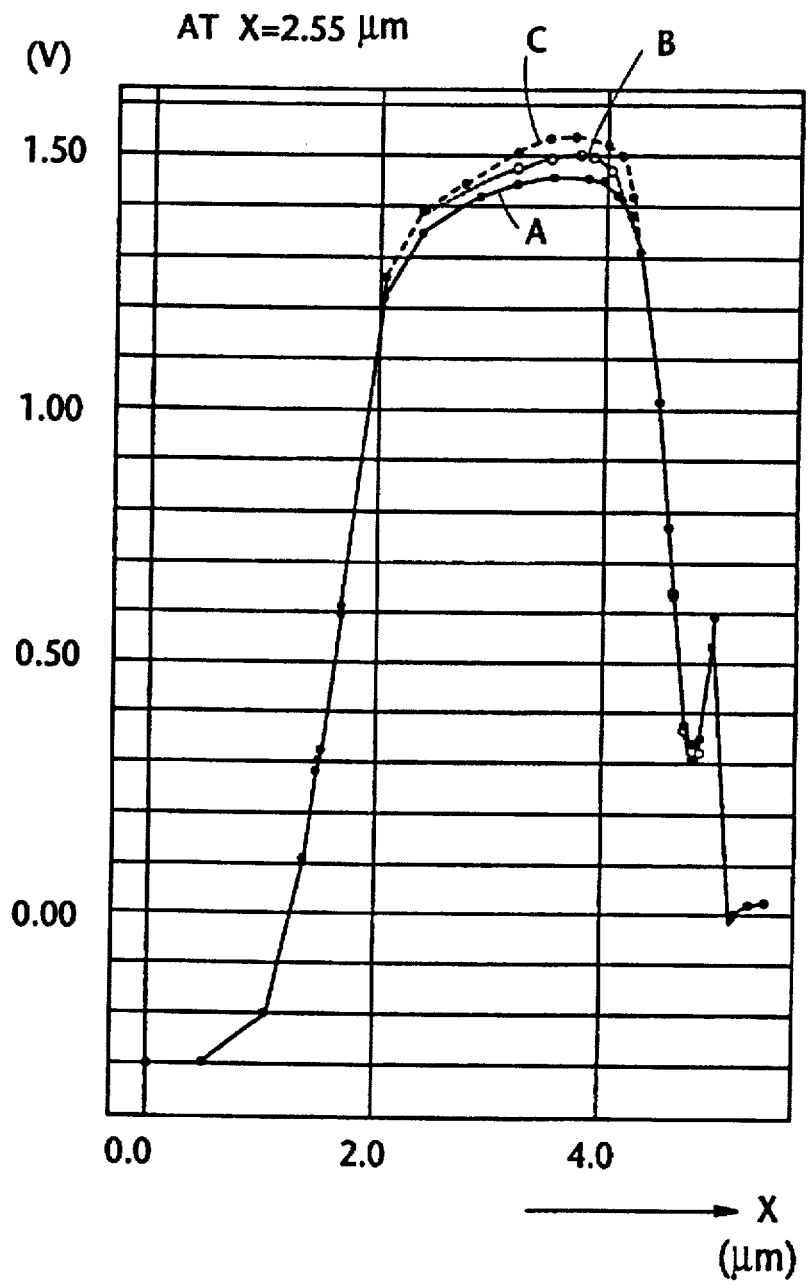

METHOD OF ESTIMATING INITIAL VALUES OF POTENTIAL IN SEMICONDUCTOR DEVICE SIMULATION

BACKGROUND OF THE INVENTION

1. Field of the Invention

The present invention relates generally to a computer device simulation and more specifically to a method of estimating initial values of potential during semiconductor device simulation.

2. Description of the Related Art

In the art of numerically analyzing a semiconductor device using a computer, it is known to utilize drift-diffusion model which has been approximated by treating carriers (viz., electrons and holes) as a fluid. Further, it is known in the art to use an energy transport model established with higher order approximation compared with the above mentioned drift-diffusion model. It is to be noted that the present invention is applicable to both the aforesaid drift-diffusion model and the energy transport model.

In a semiconductor device simulation using a drift-diffusion model under a stationary state, the following three fundamental equations (1), (5) and (6) should be established:

$$divD = \rho \quad (1)$$

$$D = \epsilon E \quad (2)$$

$$E = -\text{grad}\psi \quad (3)$$

$$\rho = q(p - n + N_D - N_A) \quad (4)$$

where

D: electric flux density;
ρ: electric charge density;
E: electric field strength;
ε: dielectric constant;
ψ: potential;
q: elementary charge;
p: hole density;
n: electron density;
$N_D$: donor density; and
$N_A$: acceptor density.

$$divJn = q \cdot (R-G) \quad (5)$$

$$divJp = -q \cdot (R-G) \quad (6)$$

where

Jn: electron current;
Jp: hole current;
R: carrier recombination term; and
G: carrier generation term.

$$Jn = q \cdot n \cdot \mu_n \cdot E + q \cdot Dn \cdot \text{grad} n \quad (7)$$

$$Jp = q \cdot p \cdot \mu_p \cdot E - q \cdot Dp \cdot \text{grad} p \quad (8)$$

where $\mu_n$: electron mobility;
$\mu_p$: hole mobility;
Dn: electron diffusion coefficient; and
Dp: hole diffusion coefficient.

$$Dn = \mu_n \cdot \{(k_B \cdot T)/q\} \quad (9)$$

$$Dp = \mu_p \cdot \{(k_B \cdot T)/q\} \quad (10)$$

where $k_B$: Boltzmann's constant; and
T: temperature.

Equation (1) is called Poisson's equation. On the other hand, equation (5) is known as an electron current continuity equation while equation (6) is known as a hole current continuity equation.

In the above equations, the variable to be solved are the potential ψ, the electron density n, and the hole density p. Generally, a plurality of input biases are firstly considered as boundary conditions. Then, the basic equations (1), (5) and (6) are solved by sequentially renewing the input biases.

Since each of the basic equations (1), (5) and (6) is a non-linear equation, it is solved using iterative calculations known as a Newton method.

The above mentioned device simulation and the Newton method are known in the art. By way of example, for further details reference should be made to a book entitled "Very High Speed MOS Devices" edited by Susumu Kohyama, published by Oxford University Press, 1990, pages 277–290.

In a device simulation, a two-dimensional region to be analyzed is partitioned into a plurality of meshes. Subsequently, the above mentioned three basic equations (1), (5) and (6) are prepared or established at each mesh point. Therefore, assuming that N represents the number of meshes, N variables develop with respect to each of potential, electron density, and hole density. Therefore, it is necessary to solve 3N simultaneous equations.

Poisson's equation (1) is rewritten into $$F_\psi(\psi, n, p) = 0 \quad (11)$$

The electron current continuity equation (5) is rewritten into $$F_n(\psi, n, p) = 0 \quad (12)$$

Further, the hole current continuity equation (6) is rewritten into $$F_p(\psi, n, p) = 0 \quad (13)$$

In the above equations (11)–(13), the notations ψ, n, and p respectively denote potential, electron density, and hole density. Further, each of the notations ψ, n, and p represents N variables over an entire two-dimensional region. As is known in the art, two methods are proposed to solve the three basic equations (11)–(13). One method is a simultaneous (or coupled) method while the other method is Gummel's method or decoupled method. Although the simultaneous method is capable of solving the equations through a smaller number of iterative calculations, it is sometimes unable to converge in the case where a good initial value is not given. On the contrary, the Gummel's method does not rely on an initial value compared with the simultaneous method. However, according to the Gummel's method, a relatively large number of iterative operations are required compared with the simultaneous method. As a result, in the event that a good initial value is given, the simultaneous (i.e., couple) method is preferable over the Gummel's method in view of the fact that an overall calculation time can be shortened.

One known approach for obtaining initial potential values for implementing iterative calculations of a device simulation, is proposed in a paper entitled "Initial guess strategy and linear algebra techniques for a coupled two-dimensional semiconductor equation solver" by Edwards, et al., NASECODE IV, 1985, pages 272–280.

However, the prior art proposed by Edwards, et al. has encountered the difficulties that a large number of calculations are inevitably required.

Therefore, what is required is a method of estimating initial values of potential with a small number of calculations.

SUMMARY OF THE INVENTION

It is the object of the present invention to provide a method of estimating initial potential values during semiconductor device simulation with a small number of calculations.

An aspect of the present invention resides in a method of estimating an initial potential value for semiconductor device simulation at each of iterative procedures, said method being implemented using a computer system, said method comprising the steps of: (a) storing a plurality of bias conditions in a memory of said computer system; (b) retrieving one bias condition from said memory at a given iterative procedure; (c) retrieving an analysis result already obtained in an iterative procedure which precedes said given iterative procedure; and (d) estimating an initial potential value for use in said given iterative procedure by solving a Laplace equation which is weighted by a coefficient $\omega$ which includes a reciprocal of electric field intensity E.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 9 is a graph showing estimated potential values obtained using the present invention and a known method;

DETAILED DESCRIPTION OF THE PREFERRED EMBODIMENTS

Figure 1:
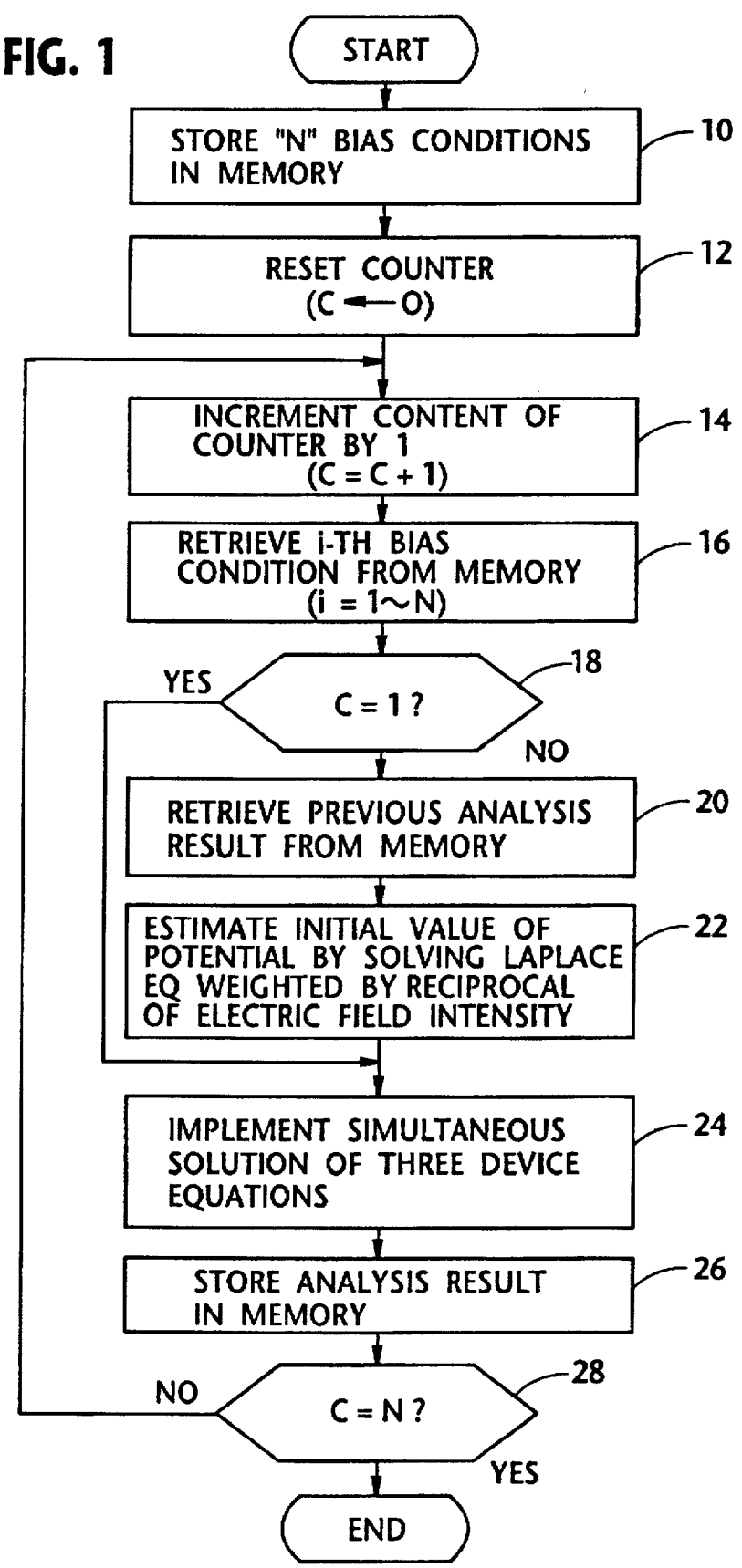
FIG. 1 is a flow chart which includes steps which characterize the present invention.

Before describing preferred embodiments of the present, it is deemed advantageous to briefly discuss the principle underlying the present invention.

Let us consider that a series of bias conditions are sequentially analyzed on a one-by-one basis. It is assumed that a given (e.g. an i-th) bias condition has been analyzed and the next (viz., (i+1)-th) bias condition is now to be analyzed. In such a case, Poisson's equation has already been established in connection with the previous bias condition.

$$divD_i = \rho_i \tag{14}$$

$$D_i = \epsilon E_i = -\epsilon grad\psi_i \tag{15}$$

where

D: electric flux density;

$\rho$: electric charge density;

E: electric field intensity; and $\epsilon$: dielectric constant.

A bias potential of the current procedure is designated by $\psi_{i+1} = \psi_i + \delta\psi_i$ (where $\delta\psi_i$ represents the previous potential variation). If carrier's re-distribution is not considered (viz., assuming that charge density's variation is not considered (i.e., $\rho_{i+1} = \rho_i$)), then we obtain $$divD_i = -\epsilon\Delta\psi_i = \rho_i \tag{16}$$

$$divD_{i+1} = -\epsilon\Delta(\psi_i + \delta\psi_i) = \rho_{i+1} \tag{17}$$

In other words, the above assumption implies that Poisson's equation (14) is only considered with both the electron and hole current continuity equations neglected.

By subtracting the both sides of equation (16) from those of equation (17), the following Laplace equation is obtained $$\epsilon\Delta\delta\psi_i = 0 \tag{18}$$

The value $\delta\psi$ which can be obtained by solving Laplace equation (18) is an approximate value of a potential variation. However, such a value is roughly approximated because re-distribution of carriers (viz., electrons and holes) is not taken into account.

As is known, within a region in the vicinity of a PN junction, the carrier density decreases due to recombination of electron-hole pairs. Further, a potential difference is large due to impurity ion charges in such a region whereby high electric field intensity is generated. This means that the resistance in such a region becomes high relative to the neighboring regions. Accordingly, the potential variations resulting from the bias applied is liable to propagate into the PN junction region. Therefore, in connection with Laplace equation (18), it can be treated that the dielectric constant is apparently small in the region where high electric field intensity is exhibited.

Accordingly, if a coefficient of Laplace equation (18) is rendered small in the region with high electric field intensity, it is possible to propagate more amount of potential variations into the high electric field region. Thus, it can be regarded that the carrier re-distribution is desirably considered when solving Laplace equation (18). In other words, if a coefficient of Laplace equation (18) is a reciprocal of the electric field intensity, a better approximate of the potential variation can be obtained. Therefore, it is possible to obtain better initial values of potential.

In such a case, the number of Laplace equations to be solved is equal to the number of initial potential values to be determined and accordingly can be halved compared with the conventional method.

In accordance with the above mentioned principle underlying the present invention, Laplace equation is solved which is weighted by a coefficient including a reciprocal of the electric field intensity as shown below.

$$\Delta(\omega \cdot \delta\psi) = 0 \tag{19}$$

$$\omega = (C_{so}/C_{s1})exp(-\alpha) \tag{20}$$

$$\alpha = \{ln(C_{so}/C_{s1})/ln(C_{f0}/C_{f1})\} \cdot ln\{(E+C_0)/C_{f1}\} \tag{21}$$

$$\omega = (C_{so}/C_{s1})\{C_{f1}/(E+C_0)\}^g \tag{22}$$

where $$B = \ln(C_{s0}/C_{s1})/\ln(C_{f0}/C_{f1})\psi_{i+1} = \psi_i + \delta\psi \quad (23)$$

where:

$\delta\psi$: potential variation;

$\psi_i$: potential which has been obtained by analyzing a previous bias condition;

$\psi_{i+1}$: initial value of potential which is used for a current bias condition;

E: electric field intensity;

$C_{s0}$: an empirically determined constant value corresponding to a maximum length characterizing a device configuration;

$C_{s1}$: an empirically determined constant value corresponding to a minimum length characterizing the device configuration;

$C_{f0}$: an empirically determined constant value corresponding to a maximum electric field intensity;

$C_{f1}$: an empirically determined constant value corresponding to a minimum electric field intensity; and $C_0$: a positive constant.

In the above, $C_0$ indicates a positive constant which ensure a calculation when the electric field intensity E is zero. Therefore, the positive constant $C_0$ is appropriately selected considering the constant value $C_{f1}$. On the other hand, the constant value $C_{f1}$ is to normalize the electric field intensity E and regulates the order of the coefficient ω. The ratio of $C_{s0}$ to $C_{s1}$ (viz., $C_{s0}/C_{s1}$) provides the maximum value in terms of the device's configuration to be analyzed and also regulates the order of the coefficient ω. It is understood that the ratio of $C_{f0}$ to $C_{f1}$ (viz., $C_{f0}/C_{f1}$) indicates the maximum variation of the electric field intensity. Finally, the logarithmic ratio $\{\ln(C_{s0}/C_{s1})/\ln(C_{f0}/C_{f1})\}$ regulates coupling intensity between the variations of the electric field and the coefficient ω.

FIG. 1 is a flow chart which depicts steps which characterize the present invention.

Firstly, a plurality of bias conditions to be analyzed are stored in an appropriate memory in a computer system (step 10). By way of example, the number of bias conditions is denoted by N. Subsequently, at step 12, a counter is reset which is provided for counting the number of bias conditions which have been analyzed. At step 14, the content of the counter is incremented by one. At the first iterative procedure, the first bias condition is retrieved from the memory at step 16, after which the routine goes to step 18 at which a check is made to determine if the content of the counter equals one (1). In this case (viz., the first iteration), the answer is affirmative and thus, the routine jumps to step 24 at which the above mentioned three device equations (1), (5) and (6) are solved using a simultaneous (or coupled) method. Following this, the result obtained by the analysis implemented at step 24 is stored in the memory (step 26), and the program goes to step 28. In this case, the content of the counter does not reach N and thus the routine returns to step 14.

If the outcome of the inquiry performed in step 18 is "NO", the program proceeds to step 20 at which the previously obtained analysis result is retrieved from the memory. Following this, at step 22, an initial value of potential is estimated by solving the Laplace equation (19) which is weighted by a coefficient which is a reciprocal of the electric field intensity (E) as above mentioned. Thereafter, the routine goes to step 24.

In the event that the answer at step 28 is "YES", the program terminates.

The present invention is further discussed in detail with two computer simulations which were conducted by the inventor. Firstly, the present invention was applied to an N-type MOSFET (Metal Oxide-Semiconductor Field-Effect Transistor), which is discussed with reference to FIGS. 2–5.

Figure 2:
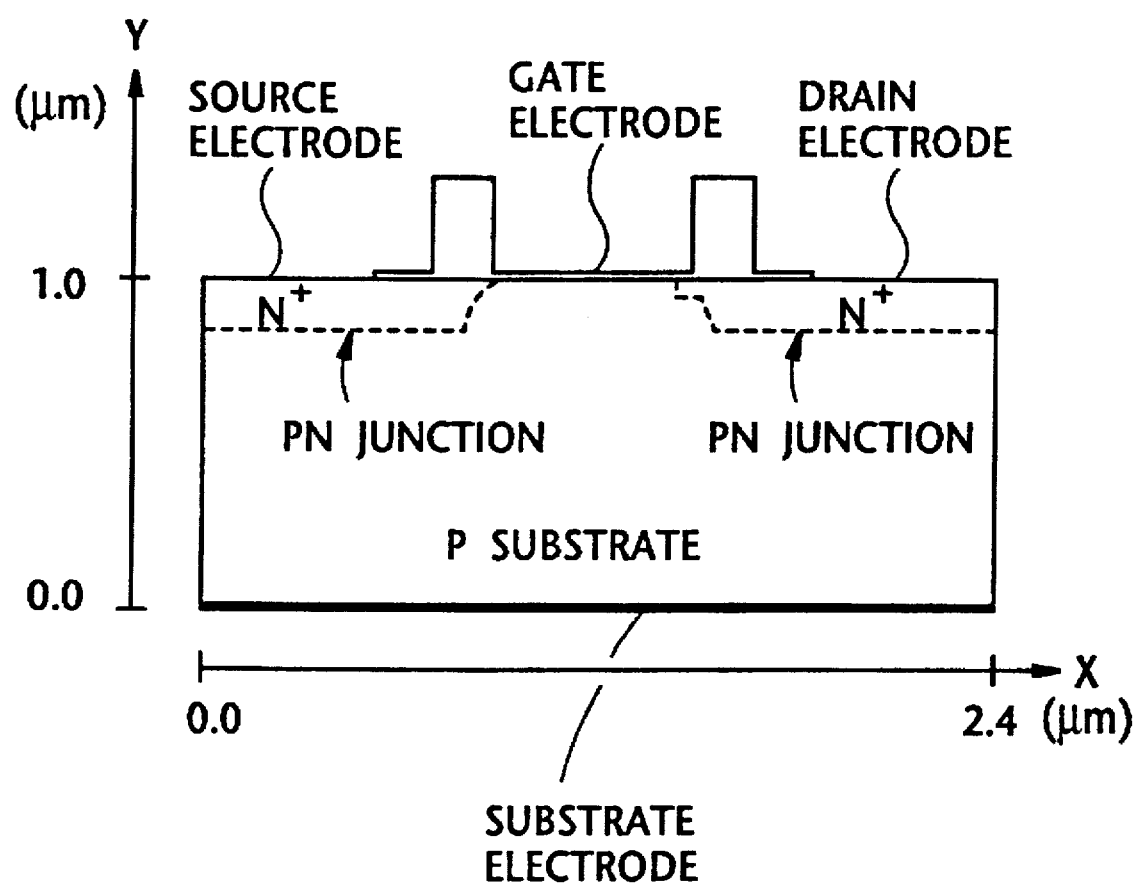
FIG. 2 is a cross section of an N-type MOSFET for use in discussing the present invention.

FIG. 2 is a diagram schematically showing a cross section of an N-type MOSFET. The configuration of the device shown in FIG. 2 is readily understood and hence no further description is given for the sake of simplifying the disclosure.

Figure 3:
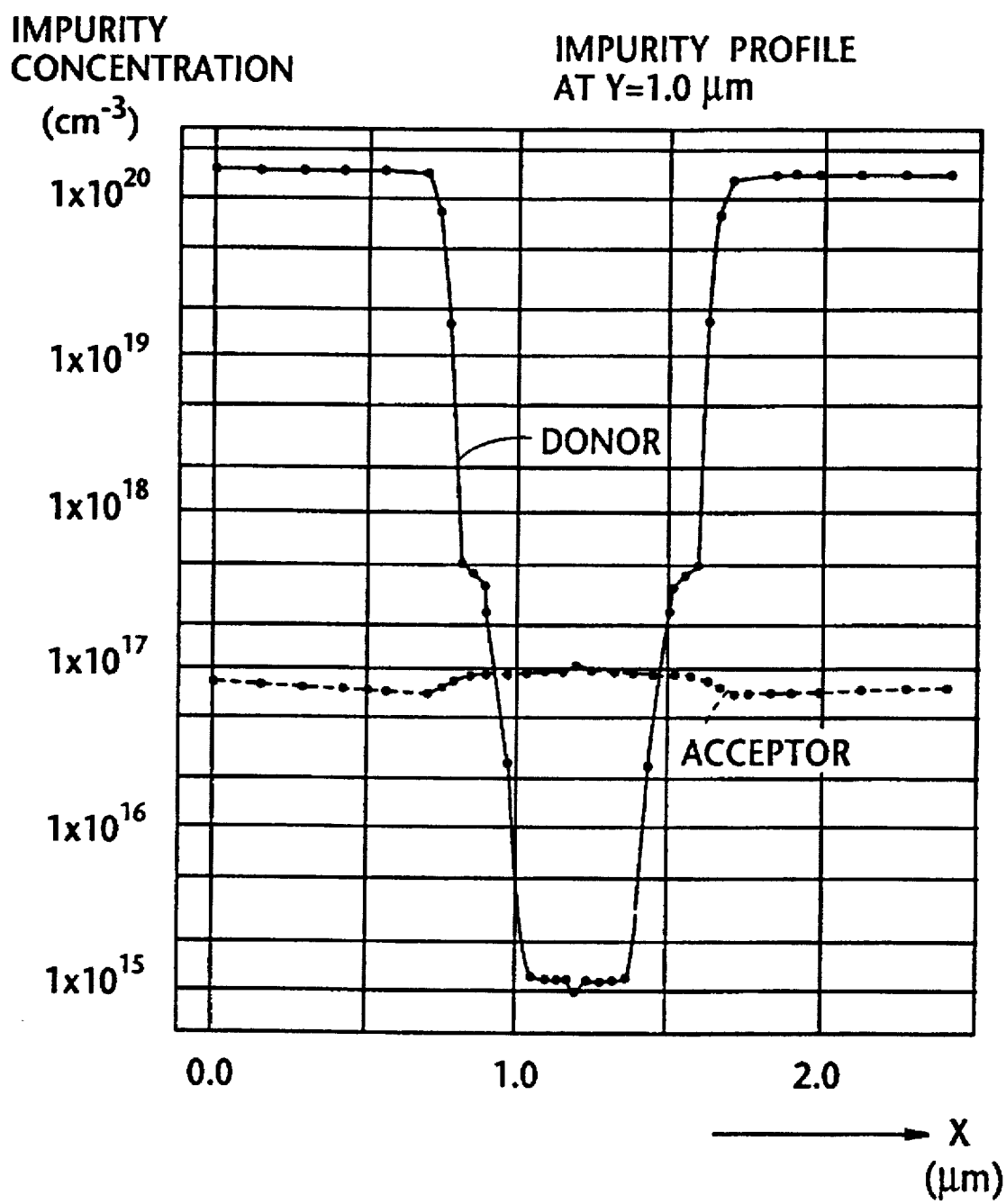
FIG. 3 is a graph showing an impurity profile at a portion of the device shown in FIG. 2.

FIG. 3 is a graph showing an impurity profile of the device of FIG. 2 at a depth of Y=1.0 μm (see FIG. 2).

Figure 4:
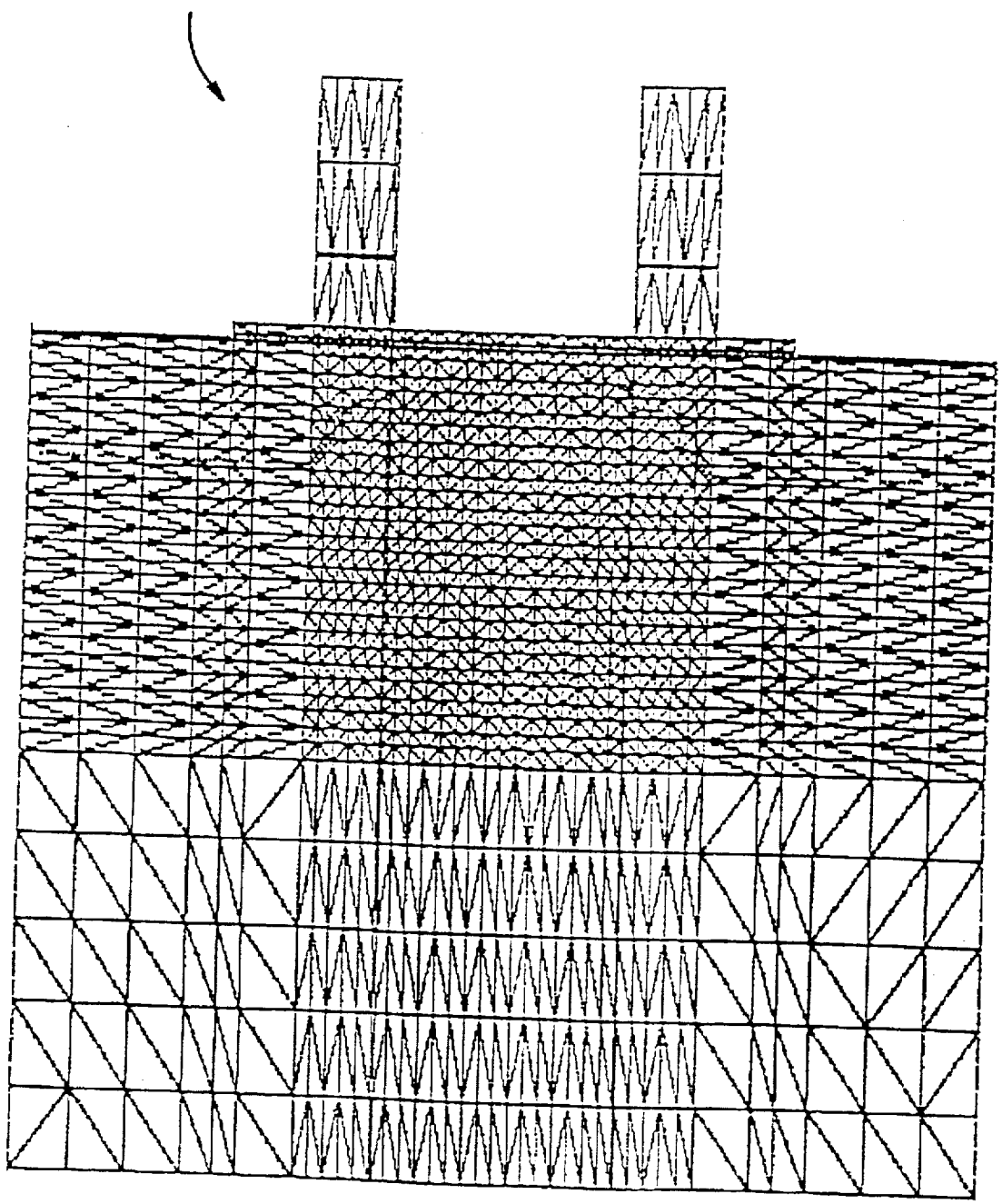
FIG. 4 is a diagram showing a plurality triangular meshes formed on the cross section shown in FIG. 2.
Figure 5:
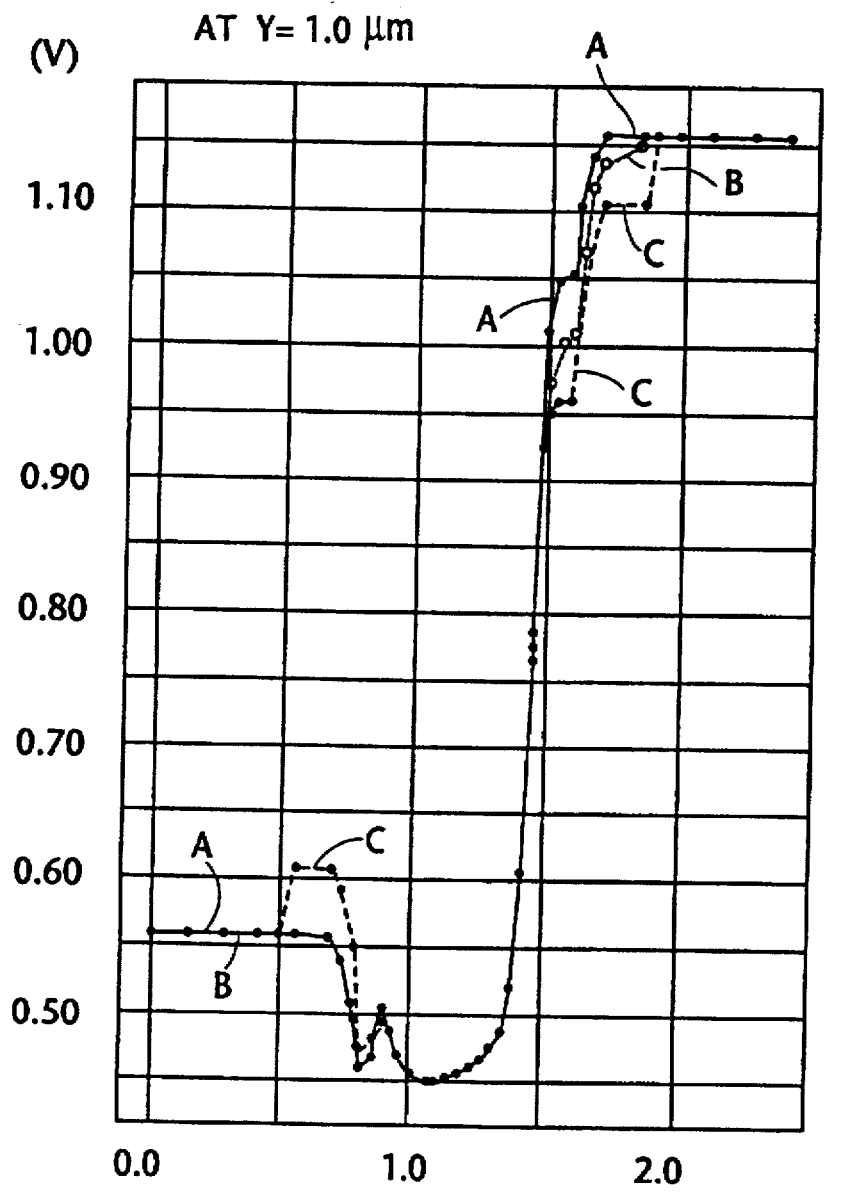
FIG. 5 is a graph showing estimated potential values obtained using the present invention and a known method.

FIG. 4 is a diagram showing the manner wherein the cross section of FIG. 2 is partitioned into 1475 triangular meshes for obtaining potential values shown in FIG. 5.

FIG. 5 is a graph showing the relationship between the two estimated initial values of potential (denoted by curves B and C) and the potential obtained by carrying out using the just mentioned initial values (denoted by A). More specifically, the curve B indicates the estimated initial value of potential obtained using the present invention, while the curve C indicates the estimated initial value of potential obtained using the above mentioned prior art (viz., the method proposed by S. P. Edwards, et al).

In order to obtain the relationship shown in FIG. 5, the bias condition at the previous iterative calculation was set such that 1.0V was applied to the gate electrode, 0.5V being applied to the drain electrode, and 0.0V being applied to both the source and substrate electrodes (FIG. 2). At the next (viz., current) iteration, only the drain bias was increased by 0.1V. It is understood that the estimated initial value of potential according to the present invention is nearer to the analysis result indicated by the curve A compared with the estimated initial potential obtained by the known technique.

The number of iterative calculations for estimating the initial potential of each mesh was four (4) according to the present invention whilst amounting to five (5) according to the known technique. In this case, the converging condition was set to $1.0 \times 10^{-6}$. Further, with a computer equipped with a CPU (Central Processing Unit) of 33 MIPS (Million Instructions Per Second), the time required for estimating each of the above mentioned initial potential values was $4.35 \times 10^{-3}$ seconds according to the present invention. On the contrary, according to the prior art, $6.23 \times 10^{-3}$ seconds was necessary for the same goal.

Secondly, the present invention was applied to an NPN-type bipolar transistor, which is discussed with reference to FIGS. 6–9.

Figure 6:
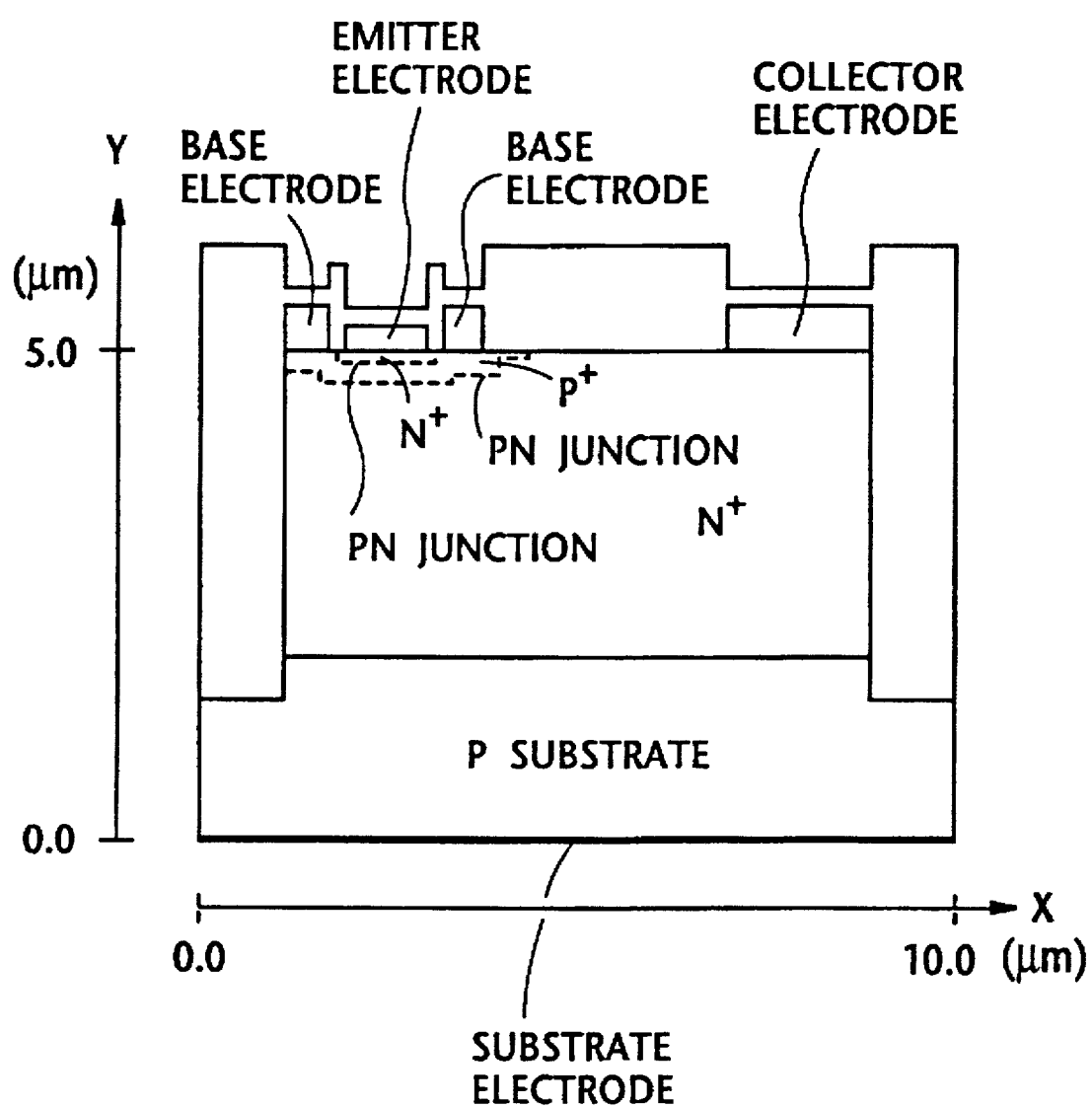
FIG. 6 is a cross section of an NPN-type bipolar transistor for further discussing the present invention.

FIG. 6 is a diagram schematically showing a cross section of the NPN-type bipolar transistor. The configuration of the device shown in FIG. 6 is readily understood and hence no further description is not given for the sake of simplifying the disclosure.

Figure 7:
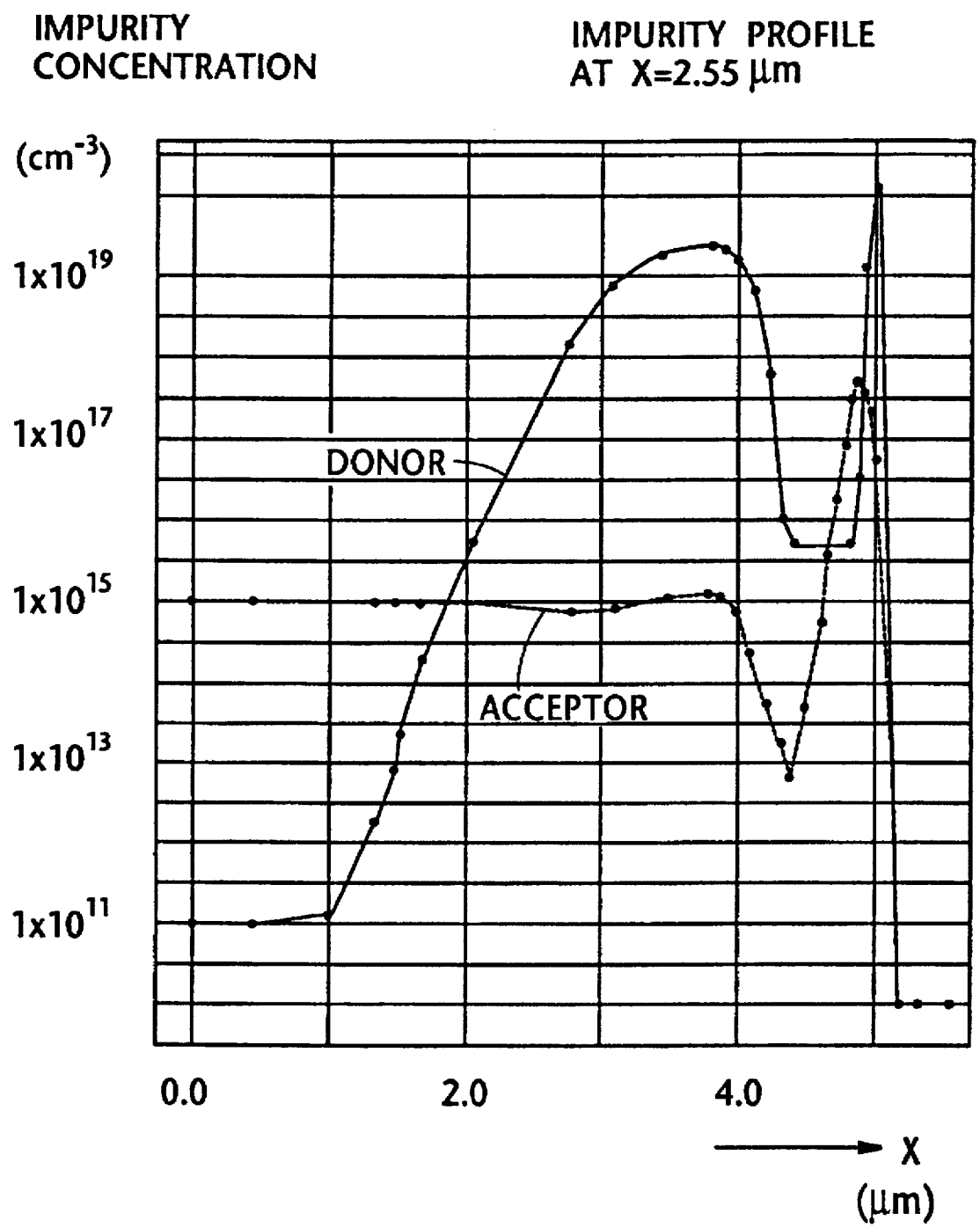
FIG. 7 is a graph showing an impurity profile at a portion of the device shown in FIG. 6.

FIG. 7 is a graph showing an impurity profile of the device of FIG. 6 at a location of X=2.55 μm (see FIG. 6).

Figure 8:
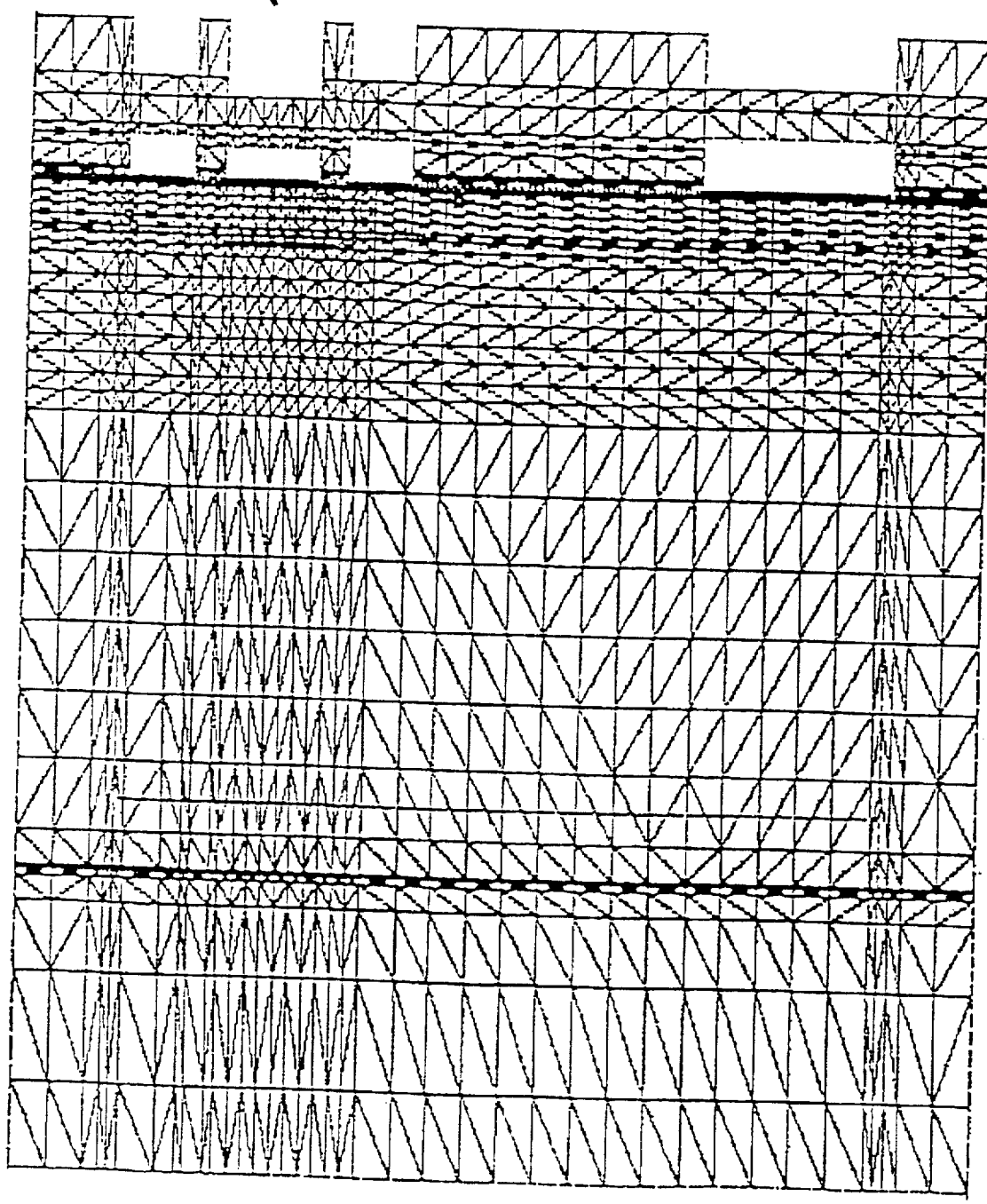
FIG. 8 is a diagram showing a plurality triangular meshes formed on the cross section shown in FIG. 6.

FIG. 8 is a diagram showing the manner wherein the cross section of FIG. 6 is partitioned into 1495 triangular meshes for obtain potential values shown in FIG. 9.

FIG. 9 is a graph showing the relationship between the two estimated initial values of potential (denoted by curves B and C) and the potential obtained by carrying out using the just mentioned initial values (denoted by A). More specifically, the curve B indicates the estimated initial value of potential obtained using the present invention, while the curve C indicates the estimated initial value of potential obtained using the above mentioned prior art (viz., the method proposed by S. P. Edwards, et al).

In order to obtain the relationship shown in FIG. 9, the bias condition at the previous iterative calculation was set such that 0.8V was applied to the base electrode, 1.05V being applied to the collector electrode, and 0.0V being applied to both the emitter and substrate electrodes (see FIG. 6). At the next (viz., current) iteration, only the base bias was increased by 0.02V. It is understood that the estimated initial value of potential according to the present invention is nearer to the analysis result indicated by the curve A compared with the estimated initial potential obtained by the known technique.

The number of iterative calculations for estimating the initial potential of each mesh was five (4) according to the present invention whilst amounting to six (5) according to the known technique. In this case, the converging condition was set to $1.0 \times 10^{-12}$. Further, with a computer equipped with a CPU (Central Processing Unit) of 33 MIPS (million Instruction Per Second), the time required for estimating each of the above mentioned initial potential values was $5.26 \times 10^{-3}$ seconds according to the present invention. On the contrary, according to the prior art, $5.29 \times 10^{-3}$ seconds was necessary for the same goal.

From the foregoing, it is understood that the present invention is able to provide good initial values of potential without rendering complex the numerical calculation. Therefore, the present invention is able to effectively shorten the calculation time for estimating initial potential values for implementing potential analysis in a device simulation.

It will be understood that the above disclosure is representative of only few possible embodiments of the present invention and that the concept on which the invention is based is not specifically limited thereto.

What is claimed is:

1. A computer-implemented semiconductor device simulation method comprising the steps of:

(a) partitioning a two-dimensional analysis region of the semiconductor device into N meshes and storing N bias conditions respectively associated with said N meshes;

(b) generating numerical values used in the semiconductor device simulation by solving a set of equations representative of said semiconductor device by the following substeps including:

(1) retrieving a first of said N bias conditions;

(2) solving said set of equations using said first bias condition; and thereafter (3) solving said set of equations using one of remaining N−1 bias conditions and an initial potential value $\psi_{i+1}$ which is estimated by solving a Laplace equation defined by:

$$\Delta(\omega \cdot \delta\psi) = 0$$

where $$\omega = (C_{s0}/C_{s1})\exp(-\alpha)$$

$$\alpha = \{\ln(C_{s0}/C_{s1})/\ln(C_{f0}/C_{f1})\} \cdot \ln\{(E+C_0)/C_{f1}\}$$

such that $$\omega = (C_{s0}/C_{s1})\{C_{f1}/(E+C_0)\}^B,$$

where $$B = \ln(C_{s0}/C_{s1})/\ln(C_{f0}/C_{f1}) \psi_{i-1} = \psi_i + \delta\psi$$

and where

δψ: potential variation;

$\psi_i$: potential obtained from a directly-preceding solution of said set of equations;

E: electric field intensity;

$C_{s0}$: a constant value corresponding to a maximum length characterizing a device configuration;

$C_{s1}$: a constant value corresponding to a minimum length characterizing the device configuration;

$C_{f0}$: a constant value corresponding to a maximum electric field intensity;

$C_{f1}$: a constant value corresponding to a minimum electric field intensity; and $C_0$: a positive constant; and (4) consecutively repeating substep (3) for remaining N−2 bias conditions; and (c) simulating the semiconductor device using said numerical values.

2. The method according to claim 1, wherein the set of equations corresponds to a Poisson's equation.

3. The method according to claim 1, wherein the set of equations is solved using a simultaneous method.

4. The method according to claim 1, wherein the set of equations is solved using a coupled method.

5. A computer-implemented semiconductor device simulation method comprising the steps of:

(a) partitioning an analysis region of the semiconductor device into N analyzing regions and storing N bias conditions respectively associated with said N analyzing regions;

(b) retrieving a first of said N bias conditions;

(c) generating and storing a numerical analysis result for an analyzing region associated with said first bias condition based on said first bias condition;

(d) generating and storing numerical analysis results for remaining N−1 analyzing regions on a one-by-one basis based on remaining N−1 bias conditions, wherein an initial potential value $\psi_{i+1}$ is used in generating the numerical analysis results for said remaining N−1 analyzing regions, said initial potential value $\psi_{i+1}$ being estimated for each of said remaining N−1 analyzing regions by solving a Laplace equation defined by:

$$\Delta(\omega \cdot \delta\psi) = 0$$

where $$\omega = (C_{s0}/C_{s1})\exp(-\alpha)$$

$$\alpha = \{\ln(C_{s0}/C_{s1})/\ln(C_{f0}/C_{f1})\} \cdot \ln\{(E+C_0)/C_{f1}\}$$

such that $$\omega = (C_{s0}/C_{s1})\{C_{f1}/(E+C_0)\}^B,$$

where $$B = \ln(C_{s0}/C_{s1})/\ln(C_{f0}/C_{f1}) \psi_{i-1} = \psi_i + \delta\psi$$

and where

δψ: potential variation;

$\psi_i$: potential obtained from a directly-preceding numerical analysis result;

E: electric field intensity;

$C_{s0}$: a constant value corresponding to a maximum length characterizing a device configuration;

$C_{s1}$: a constant value corresponding to a minimum length characterizing the device configuration;

$C_{f0}$: a constant value corresponding to a maximum electric field intensity;

$C_{f1}$: a constant value corresponding to a minimum electric field intensity; and $C_0$: a positive constant; and (e) simulating the semiconductor device using said numerical values.

6. The method according to claim 5, wherein said N bias conditions represent a set of boundary conditions at each of said N analyzing regions.

7. The method according to claim 6, wherein the step of generating a numerical analysis result in steps (c) and (d) includes the step of solving a Poisson's equation.

8. The method according to claim 6, wherein the step of generating a numerical analysis result in steps (c) and (d) includes the step of solving a set of device equations using a simultaneous method.

9. The method according to claim 6, wherein the step of generating a numerical analysis result in steps (c) and (d) includes the step of solving a set of device equations using a coupled method.

10. The method according to claim 5, wherein said N analyzing regions comprise of N triangular meshes.

11. A computer used in semiconductor device simulation, said computer being programmed to carry out the steps of:

(a) partitioning a two-dimensional analysis region of the semiconductor device into N meshes and storing N bias conditions respectively associated with said N meshes;

(b) generating numerical values used in the semiconductor device simulation by solving a set of equations representative of said semiconductor device by the following substeps including:

(1) retrieving a first of said N bias conditions;

(2) solving said set of equations using said first bias condition; and thereafter (3) solving said set of equations using one of remaining N−1 bias conditions and an initial potential value $\psi_{i+1}$ which is estimated by solving a Laplace equation defined by:

$$\Delta(\omega \cdot \delta\psi) = 0$$

where $$\omega = (C_{s0}/C_{s1})\exp(-\alpha)$$

$$\alpha = \{\ln(C_{s0}/C_{s1})/\ln(C_{f0}/C_{f1})\} \cdot \ln\{(E+C_0)/C_{f1}\}$$

such that $$\omega = (C_{s0}/C_{s1})\{C_{f1}/(E+C_0)\}^B,$$

where $$B = \ln(C_{s0}/C_{s1})/\ln(C_{f0}/C_{f1}) \psi_{i-1} = \psi_i + \delta 104$$

and where $\delta\psi$: potential variation;

$\psi_i$: potential obtained from a directly-preceding solution of said set of equations;

E: electric field intensity;

$C_{s0}$: a constant value corresponding to a maximum length characterizing a device configuration;

$C_{s1}$: a constant value corresponding to a minimum length characterizing the device configuration;

$C_{f0}$: a constant value corresponding to a maximum electric field intensity;

$C_{f1}$: a constant value corresponding to a minimum electric field intensity; and $C_0$: a positive constant; and (4) consecutively repeating substep (3) for remaining N−2 bias conditions; and (c) simulating the semiconductor device using said numerical values.

12. The computer according to claim 11, wherein said computer has a memory, and said N bias conditions and solutions to said set of equations are stored in said memory.

13. The computer according to claim 12, wherein said N bias conditions represent a set of boundary conditions at each of said N meshes.

* * * * *